United States Patent [19]

Braitberg et al.

[11] 3,807,042

[45] Apr. 30, 1974

[54] METHOD OF MAKING A MAGNETIC HEAD STRUCTURE

[75] Inventors: Michael F. Braitberg; Robert V. G. Brown, both of Littleton, Colo.

[73] Assignee: Honeywell Inc., Minneapolis, Minn.

[22] Filed: Aug. 16, 1972

[21] Appl. No.: 281,223

[52] U.S. Cl. ............................ 29/603, 179/100.2 C

[51] Int. Cl. ............................ G11b 5/42, H01f 7/06

[58] Field of Search ................ 29/603; 179/100.2 C; 340/174.1 F; 346/74 MC

[56] References Cited

UNITED STATES PATENTS

| | | | |
|---|---|---|---|
| 3,562,442 | 2/1971 | Pear, Jr. | 29/603 X |
| 3,614,339 | 10/1971 | Schneider | 29/603 X |
| 3,624,897 | 12/1971 | Reade et al. | 29/603 |
| 3,534,470 | 10/1971 | Faure et al. | 29/603 |
| 3.400,386 | 9/1968 | Sinnott | 29/603 X |
| 3,187,410 | 6/1965 | Duinker et al. | 29/603 |
| 3,668,775 | 6/1972 | Morita et al. | 29/603 |
| 3,145,452 | 8/1964 | Camras | 29/603 |

*Primary Examiner*—Charles W. Lanham
*Assistant Examiner*—Carl E. Hall
*Attorney, Agent, or Firm*—Arthur H. Swanson; Lockwood Burton; Mitchell J. Halista

[57] ABSTRACT

A magnetic head having a gap plate adhesively bonded to a core structure with a plurality of transducer gaps and inter-gap shields located in an integral construction and a method for making this magnetic head.

4 Claims, 12 Drawing Figures

METHOD OF MAKING A MAGNETIC HEAD STRUCTURE

The present invention relates to magnetic heads. More specifically, the present invention is directed to a method for producing a magnetic head having a separate gap plate for achieving precise alignment of transducer gaps while providing a magnetic head structure with a plurality of shielded transducer gaps.

An object of the present invention is to provide an improved magnetic head.

Another object of the present invention is to provide a novel method for manufacturing an improved magnetic head having a plurality of magnetic transducer gaps in an integral configuration.

SUMMARY OF THE INVENTION

In accomplishing these and other objects, there has been provided, in accordance with the present invention, a method of manufacturing a novel magnetic head including the steps of joining two flat surfaces of separate ferrite bars with non-magnetic spacer material, cutting the back of the joined bars with transverse slots for insertion of magnetic shields, lapping the assembled structure to form a flat surface encompassing the shields and bars and assembling the gap plate so constructed to a housing supporting the magnetic windings wrapped on C cores inserted therein to align a C core adjacent to a corresponding ferrite bar in the gap plate. The gap plate is bonded to the core and winding housing by an adhesive which is drawn into the space between the gap plate and the adjacent edge of the housing by the effect of a vacuum applied to the inside of the housing.

BRIEF DESCRIPTION OF THE DRAWINGS

A better understanding of the present invention may be had when the following detailed description is read in connection with the accompanying drawings in which.

DETAILED DESCRIPTION

Referring to FIGS. 1 through 11 in more detail, there is shown a sequence of manufacturing operations embodying the present invention for producing a magnetic head structure having a plurality of magnetic transducer gaps in an integral arrangement. Starting with FIG. 1 there is shown a pair of adjacent bars 1, 3 of a suitable magnetic material, e.g., ferrite, having a substantially trapezoidal cross-section. The top, or smaller side, of the trapazoid is used as a longitudinal end-face of each of the bars 1, 3, which end-faces are lapped to produce confronting flat surfaces. A plurality of gap spacers of suitable material, e.g., hard glass, are deposited on the flat surface of one of the bars using a suitable technique, e.g., RF sputtering.

It should be noted that while the deposited gap spacers are shown as individual strips 5 separated by spaces 4 along the end face of both of the bars 1, 3, it may be desirable to apply a layer of hard glass to the entire end face of the ferrite bars to avoid alignment problems between the gap plate formed by the ferrite bars 1, 3 and a magnetic core assembly described hereinafter. The RF sputtering of the hard glass on the ferrite bar produces a mechanical bond of the glass to the ferrite. This deposition of the hard glass avoids the presence of a fluid state in the glass which enables precise control over the thickness of the hard glass layer, e.g., ±0.5 micro-inch, and produces a fully dense layer without voids or bubbles. The hard glass layers are preferably in the range of 10 to 500 micro-inches to produce a range of transducer gaps for various magnetic record and/or playback applications.

Figures 1, 2, 3, 4, 5, 6, 7:
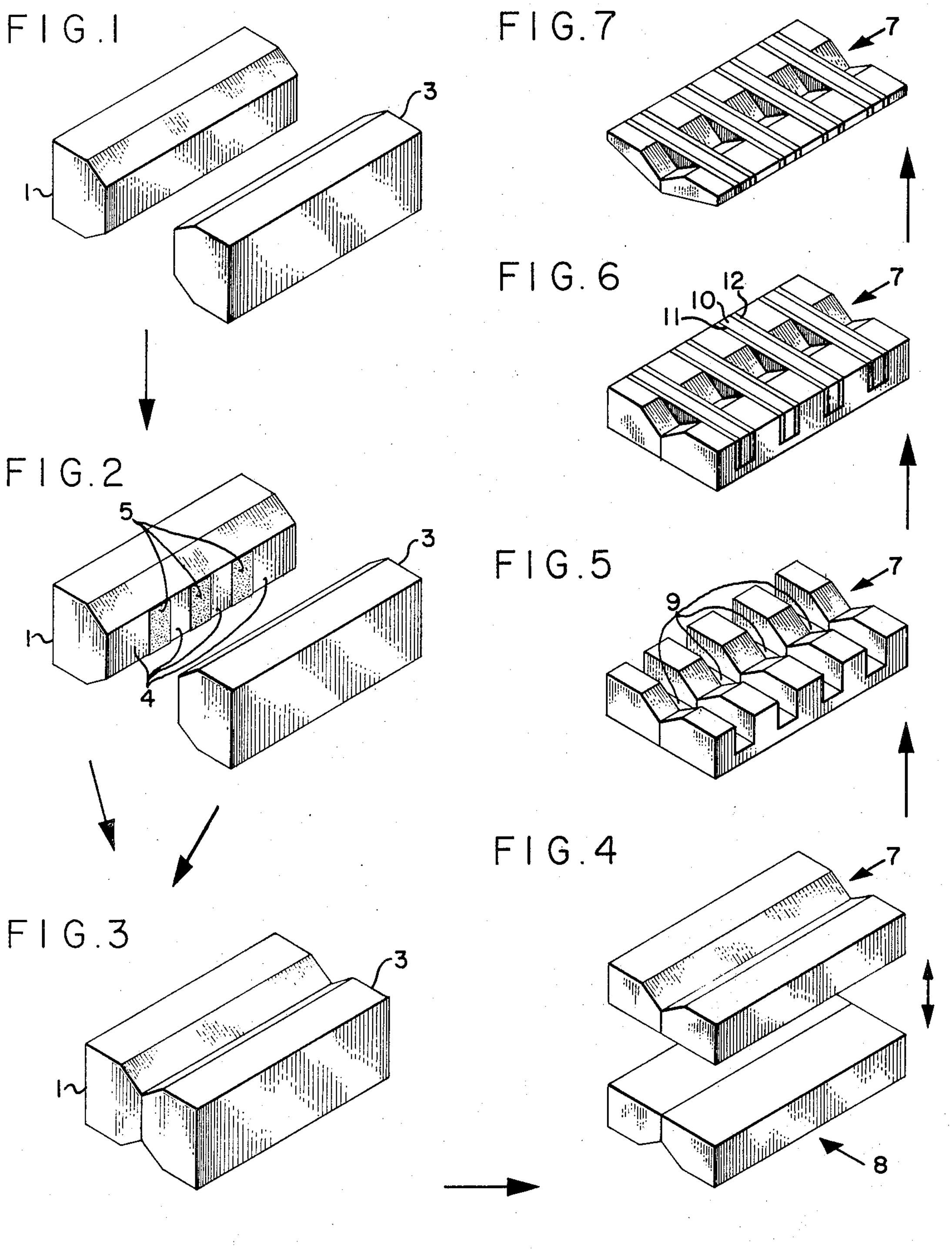
FIGS. 1 through 11 are step-by-step illustrations of the sequential manufacturing techniques embodying the present invention for producing a novel magnetic head.

After the spacer layers have been deposited on the aforesaid flat surface of each of the bars, 1, 3 the two bars 1, 3 are brought together and heated to allow the gap spacers to provide an adhesive material, i.e., a diffusion bond between the hard glass layers, for securing the confronting end surfaces, of the bars, 1, 3 as shown in FIG. 3. The hard glass layers are heated to a temperature of approximately 650°C to produce the diffusion bond which eliminates the need for mechanical spacers in the transducer gap since there is no flow of the hard glass layers. Subsequently, the bars 1, 3 are cut lengthwise along a plane perpendicular to the secured end faces to produce two similar gap plate structures 7, 8. Using plate 7 as an example, the back surface of a gap plate on the other side of the aforesaid cut separating the two substantially identical gap plates 7, 8 is slotted at regular intervals to provide slots 9 for holding an assembly of magnetic and non-magnetic spacers 10, 11, 12 with the magnetic spacer 10 forming an inter-head shield. An assembly of magnetic and non-magnetic spacers is inserted in each of the transverse slots with a magnetic spacer 10 being sandwiched between two non-magnetic spacers 11, 12 as shown in FIG. 6.

The non-magnetic spacers may be made of glass while the magnetic spacer may be of ferrite which is adhesive bonded to the glass spacers and the assemblies are similarly adhesive bonded into the slots 9. An alternate method would be to bond the magnetic spacer to the slot 9 with soft glass or ceramic having a processing temperature below that the gap spacer layers. In either case, the materials used for the magnetic shield 10 and the spacers 11, 12 must be compatible in terms of wear rate and coefficient of a thermal expansion. The slots 9 are each of substantially similar dimensions with a depth sufficient to allow the spacers 10, 11 and 12 to extend into the area of the gap spacer layer for a distance equal to at least the depth of the desired final transducer gap. The back edges of the spacers 10, 11, 12 and the adjacent face of the plate 7 are lapped to provide a smooth surface suitable for mating with the core structure described hereinafter. Subsequently, the gap plate 7 is milled on the surface opposite to the aforesaid slotted surface to provide relief on both sides of the plane of the transducer gap to reveal the assemblies of spacers 10, 11 and 12.

A core structure, or back core assembly, suitable for mating with the gap plate produced as described above is formed from a block 14 of non-magnetic material, e.g., aluminum. A longitudinal face of the block 14 is transversely slotted at regular intervals to provide two alternating slot widths and depths. A first type slot 15 having a greater depth and narrower width than a second type slot 16 is arranged to hold a magnetic shield while the second type slot 16 is provided for supporting a magnetic core structure, as described hereinafter.

The number of first type slots 15 is one greater than the second type slots 16 to provide a magnetic shield on both sides of each of the magnetic core assemblies. Thus, a first slot 15 is located at each end of the block 14 and between each of the second slots 16. The slots 15 and 16 are spaced apart by distances compatible with locations of the shields 10 and gap spacers in the gap plate 7 whereby each of the first slots 15 is located for ultimate alignment with a corresponding one of the shields 10 and each of the second slot 16 is for ultimate alignment with a corresponding one of the gap spacers 5 located between the assembly of spacers 10, 11 and 12 in the gap plate 7. A longitudinal slot 16*a* is subsequently introduced across the aforesaid transverse slots 15, 16 to a depth approximately equal to the depth of the first type slots 15. Finally, the block 14 is provided with a pair of threaded holes 17 in one end thereof suitable for allowing the block 14 to be ultimately mounted in a tape transport apparatus.

Figures 8, 9, 10, 11, 12:
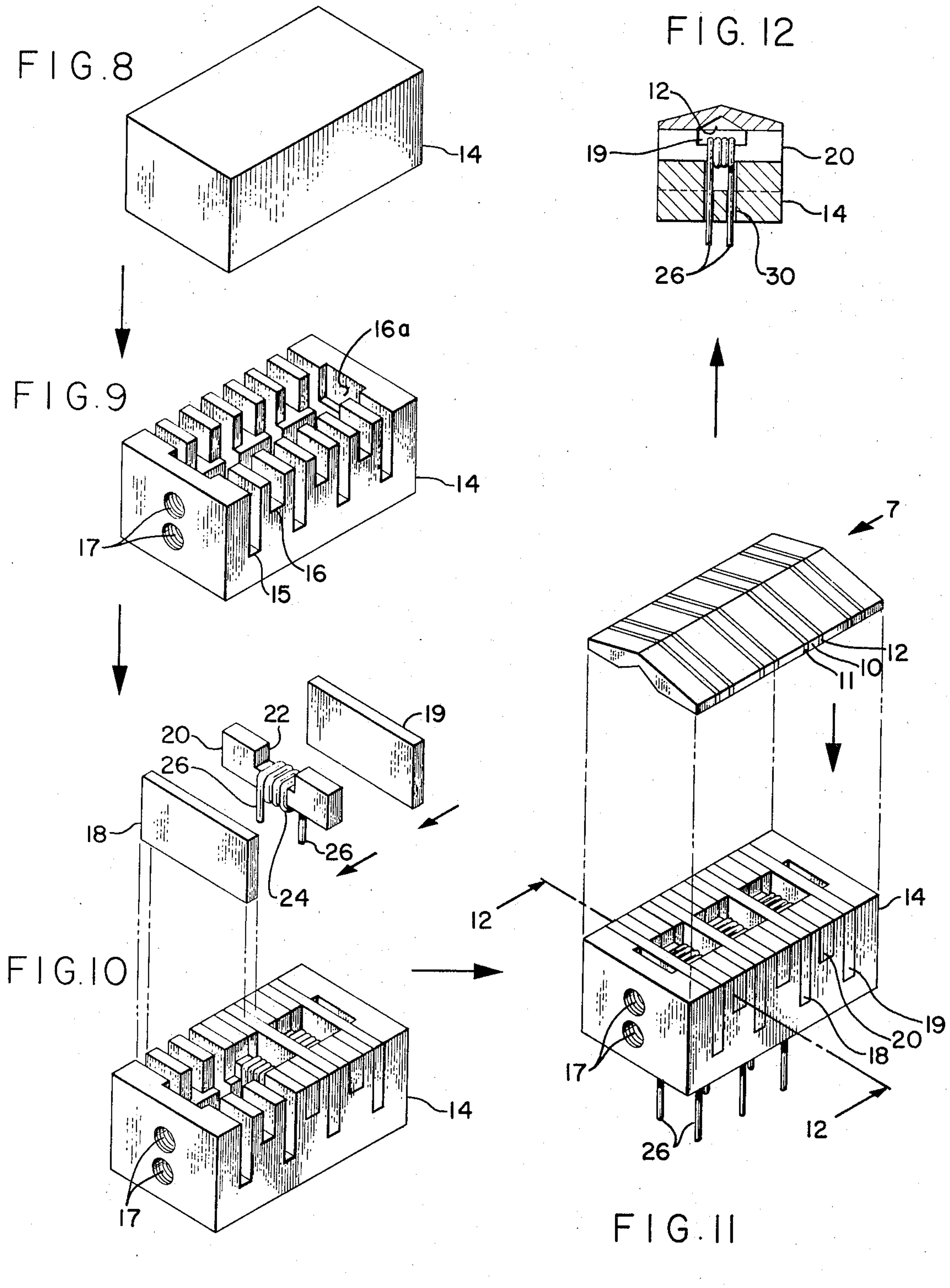
FIG. 12 is a cross-section of an assembled novel magnetic head using the method shown in FIGS. 1 to 11.

As shown in FIG. 10, a plurality of magnetic shields, e.g., ferrite, having a height sufficient to fill the first slots 15 are inserted therein, e.g., shields 18, 19. A magnetic core member, e.g., core member 20, formed from a shallow C core of suitable magnetic material, e.g., ferrite, and having a recessed central portion 22 is provided with a winding 24 on the central portion 22. The winding 24 is terminated in a pair of wire ends 26 for providing an electrical connection to the winding 24.

The back surface of the block 14 opposite to the surface having the aforesaid slots therein is provided with a plurality of holes, e.g., holes 30 shown in FIG. 12, suitable for passing the ends of the wires 26 from the coil windings 24 therethrough. The wire ends 26 may be sealed in the holes 30 to provide a hermetic seal around the wires 26. The assembled core structure is lapped on the surface having the slots and cores inserted therein to provide a flat surface suitable for mating with the aforesaid gap plate 7. On the other hand, the spaces between the cores 20 and shields 18 and 19 on the face of the block 14 are etched approximately 100 micro-inches to provide a capillary path for a bonding adhesive between the block 14 and the gap plate 7.

The gap plate 7 is attached to the block 14 by placing the gap plate 7 on the block 14 with aforesaid cores, spacers and transducer gaps in alignment and applying a vacuum to the inside of the block 14 by any suitable means. For example, a port (not shown) through the block 14 may be provided to communicate with the slot 16*a* while being suitable for sealing after the assembly operation to hermetically isolate the interior of the block 14. The vacuum is effective to hold the plate 7 tightly to the block 14. Mechanical and electrical inspections can be performed at this time and, if the head is found to be acceptable, a bead of adhesive is applied along the seam between the plate 7 and block 14. The vacuum, aided by capillary action is effective to draw the adhesive into the seam which has been etched, as described above, to aid this bonding operation. Thus, the gap plate 7 can be aligned with the block 14 and the windings 24 tested before the adhesive is applied while the alignment is retained during the subsequent application and setting of the adhesive.

Accordingly, it may be seen that there has been provided, in accordance with the present invention, a novel method for producing an improved magnetic head having a plurality of individually shielded transducer gaps in an integral construction.

The embodiments of the invention in which an exclusive property or privilege is claimed are defined as follows:

1. A method of assembling a magnetic head structure comprising the steps of bonding a pair of magnetic material bars along confronting faces with a non-magnetic spacer to form a gap plate, cutting slots in said gap plate transverse to and through said non-magnetic spacer to define a plurality of pole piece units, each having a tranducer gap, inserting magnetic shields in said slots, removing magnetic material from said gap plate to magnetically isolate said pole pieces, positioning magnetic core assemblies in a support structure having slots for receiving said core structures, positioning said gap plate on said support structure with said core assemblies in alignment and contact with said pole piece units of said gap plate, applying a vacuum to the inside of said support structure exposed to said gap plate, applying an adhesive to a seam between said gap plate and said support structure said vacuum being effective to hold the gap plate in place and aid in drawing the adhesive into the seam, and removing said vacuum after setting of said adhesive to bond said gap to said support structure.

2. A method as set forth in claim 1 and including the further steps of cutting slots in said support structure parallel to said slots in said gap plate and in alignment therewith and inserting magnetic shields in said slots in said support structure.

3. A method as set forth in claim 1 and including the steps of depositing said non-magnetic spacer on each of said confronting faces of said pair of magnetic material bars to form a mechanical bond between said spacer and a corresponding face of said magnetic material bars, bringing said spacers on said confronting faces into intimate contact and heating said spacers while maintaining said spacers in contact to bond said confronting faces.

4. A method as set forth in claim 1 and including the steps of depositing hard glass on said confronting faces by RF sputtering, assembling said confronting end faces with said hard glass deposits in contact and heating said bars and hard glass deposits to approximately 650°C to produce a diffusion bond of said hard glass deposits.

* * * * *

UNITED STATES PATENT OFFICE

CERTIFICATE OF CORRECTION

Patent No. 3,807,042 Dated April 30, 1974

Inventor(s) Michael F. Braitberg; Robert V.G. Brown

It is certified that error appears in the above-identified patent and that said Letters Patent are hereby corrected as shown below:

In Claim 1, line 34, after "gap", insert ---plate---;

Signed and sealed this 27th day of August 1974.

SEAL)
ttest:

cCOY M. GIBSON, JR.
ttesting Officer

C. MARSHALL DANN
Commissioner of Patents